US012389219B2

(12) United States Patent
Graybeal et al.

(10) Patent No.: US 12,389,219 B2
(45) Date of Patent: *Aug. 12, 2025

(54) CORRELATING DEVICES AND CLIENTS ACROSS ADDRESSES

(71) Applicant: Cisco Technology, Inc., San Jose, CA (US)

(72) Inventors: John Martin Graybeal, Califon, NJ (US); Jerome Henry, Pittsboro, NC (US); Paul Anthony Polakos, Marlboro, NJ (US); Louis Gwyn Samuel, Gloucestershire (GB); John George Apostolopoulos, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/301,937

(22) Filed: Apr. 17, 2023

(65) Prior Publication Data

US 2023/0254687 A1 Aug. 10, 2023

Related U.S. Application Data

(63) Continuation of application No. 17/215,138, filed on Mar. 29, 2021, now Pat. No. 11,632,671.

(51) Int. Cl.
*H04W 8/02* (2009.01)
*H04W 8/26* (2009.01)
*H04W 84/12* (2009.01)

(52) U.S. Cl.
CPC .............. *H04W 8/26* (2013.01); *H04W 8/02* (2013.01); *H04W 84/12* (2013.01)

(58) Field of Classification Search
CPC ......... H04W 8/26; H04W 8/02; H04W 84/12; H04W 4/02; H04W 12/04; H04W 64/00; H04W 12/104; H04L 61/5038; H04L 61/5092; H04L 2101/622
See application file for complete search history.

(56) References Cited

U.S. PATENT DOCUMENTS

| 8,886,210 B1 | 11/2014 | Sugar |
| 9,854,400 B2 | 12/2017 | Apostolopoulos et al. |
| 10,244,388 B2 * | 3/2019 | Ding ..................... H04W 8/26 |
| 10,360,573 B1 * | 7/2019 | Nguyen ............ G06Q 30/0201 |
| 10,506,498 B1 | 12/2019 | Bloechl et al. |
| 2017/0201930 A1 * | 7/2017 | Chen ..................... H04W 40/02 |
| 2018/0324142 A1 | 11/2018 | Adrangi et al. |
| 2018/0338033 A1 * | 11/2018 | Boule ..................... G01S 19/52 |

(Continued)

*Primary Examiner* — Khawar Iqbal
(74) *Attorney, Agent, or Firm* — Merchant & Gould P.C.

(57) ABSTRACT

Correlating devices and clients across addresses may be provided. A first address associated with a client device may be received. When the client device is not connected to a network, first location data associated with the first address may be obtained using a passive technique. A second address and second location data associated with the second address may then be obtained using an active technique. It may then be determined that the first location data and the second location data correlate. In response to determining that the first location data and the second location data correlate, it may be determined that the client device has changed from the first address to the second address.

20 Claims, 5 Drawing Sheets

(56) References Cited

U.S. PATENT DOCUMENTS

| | | |
|---|---|---|
| 2019/0028170 A1 | 1/2019 | Zhang et al. |
| 2019/0220874 A1* | 7/2019 | Nguyen ................ H04W 8/005 |
| 2019/0369202 A1 | 12/2019 | Smith et al. |
| 2020/0296683 A1 | 9/2020 | Worsfold et al. |
| 2020/0359113 A1* | 11/2020 | Dahm ................. H04L 63/1491 |
| 2021/0400483 A1* | 12/2021 | Lev ....................... H04W 4/029 |
| 2022/0021670 A1* | 1/2022 | Cafasso ............. H04L 63/0876 |
| 2022/0053021 A1* | 2/2022 | Li ....................... H04L 63/1475 |
| 2022/0078575 A1* | 3/2022 | Raveendran .......... H04L 67/535 |
| 2022/0086627 A1* | 3/2022 | Montemurro ........... H04L 61/25 |
| 2022/0131829 A1* | 4/2022 | Bernardos ........... H04L 61/5014 |
| 2022/0200950 A1* | 6/2022 | Sekar .................... H04W 12/06 |
| 2022/0225221 A1* | 7/2022 | Giraldo-Suarez ..... H04W 48/16 |
| 2023/0300131 A1* | 9/2023 | Fang .................... H04W 12/08 |
| | | 713/170 |

* cited by examiner

CORRELATING DEVICES AND CLIENTS ACROSS ADDRESSES

CROSS-REFERENCE TO RELATED APPLICATION

This application is a continuation of U.S. patent application Ser. No. 17/215,138, filed Mar. 29, 2021, titled "Correlating Devices and Clients Across Addresses", the disclosure of which is incorporated herein by reference in its entirety.

TECHNICAL FIELD

The present disclosure relates generally to correlating devices and clients.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a controlling entity, such as a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Correlating devices and clients across addresses may be provided. A first address associated with a client device may be received. When the client device is not connected to a network, first location data associated with the first address may be obtained using a passive technique. A second address and second location data associated with the second address may then be obtained using an active technique. It may then be determined that the first location data and the second location data correlate. In response to determining that the first location data and the second location data correlate, it may be determined that the client device has changed from the first address to the second address.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

EXAMPLE EMBODIMENTS

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Identifying a wireless client device by its Media Access Control (MAC) address may be important for many applications, but this may be challenged by the move to periodically randomizing the client device's MAC address to improve user privacy. Consistent with embodiments of the disclosure, by leveraging the below described processes and correlating their data with existing location data (e.g., derived from active communications and emissions from client devices, plus other data such as video cameras, etc.), device ambiguity brought on by MAC randomization may be resolved. In addition, embodiments of the disclosure may preserve the privacy of a user's identity, which may be a reason for randomization in the first place. Accordingly, embodiments of the disclosure may address the problem that MAC randomization poses.

Wirelessly connected client devices (e.g., stations) may be identified at the network level by their MAC address. However, client devices my frequently change (i.e., randomizing) their MAC address, for example, for privacy reasons. While such MAC address randomization may be associated with smartphones, it may also extend to other devices classes such as wearables, Internet-of-Things (IoT) devices, etc. While embodiments of the disclosure may be described in terms of the Institute of Electrical and Electronics Engineers (IEEE) 802.11 standard (e.g., Wi-Fi), embodiments of the disclosure may also be applicable to other wireless access technologies with similar network identifiers that may be subject to change.

Randomization may present multiple challenges to the network and the network administrators, for reasons that do not involve privacy. For example, randomization may lead to waste in network resources (e.g., Internet Protocol (IP) address pool, total client count, etc.). In addition, randomization may create problems for other applications, for example, counting people or client devices in a building or space, estimating people density for social distancing, locating an individual user or client device in emergency situations (e.g., rescue during a fire, E911, locating an IoT device, etc.). Furthermore, the network management level may not possess other unique primary identifiers for a client device that may be specified under communication protocols of the access technology being used. The network layer may not have the same visibility as other layers. For example, the application layer may have access to device Application Programming Interfaces (APIs) into the operating system, providing access to other identifiers and data that may uniquely identify the client device and/or its owner.

MAC randomization may occur during times when a client device is not transmitting data to the network or receiving data from the network. Furthermore, a user carrying a wireless client device or an IoT device may also move locations in the intervening time. In other words, its prior communication with the network (with a prior MAC address) may have been with one Access Point (AP) at one location within the network, and its next communication with the network at a later time (using a newly randomized MAC address) may occur with a different AP at a different location within the network. This may create a challenge for the network management layer to recognize that a given client or IoT device with a given MAC address is actually the same device that previously attached to the network using a different MAC address (e.g., potentially from a different location within the network). Accordingly, correlating addresses (e.g., MAC addresses) before and after randomization events may be provided by embodiments of the disclosure so that the MAC address before the randomization and the MAC address afterward the randomization may be connected.

Figure 1:
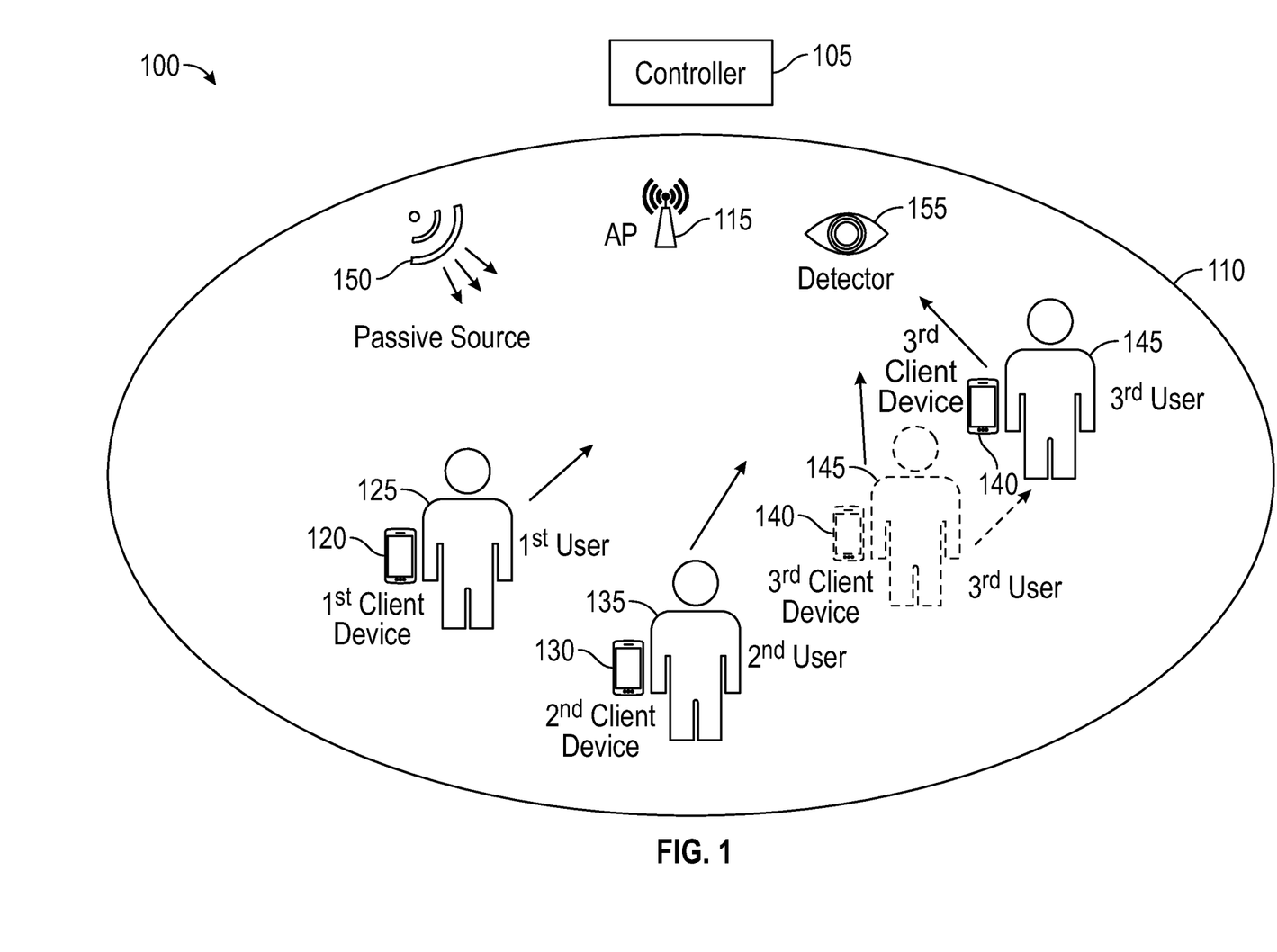
FIG. 1 is a block diagram of an operating environment for correlating devices and clients across addresses.

FIG. 1 shows an operating environment 100 for correlating devices and clients across addresses. As shown in FIG. 1, operating environment 100 may comprise a controller 105, a coverage environment 110, and a client device 115. Coverage environment 105 may comprise, but is not limited to, a Wireless Local Area Network (WLAN) comprising an Access Point (AP) 115 that may provide wireless network access (e.g., access to the WLAN) for a first client device 120 operated by a first user 125, a second client device 130 operated by a second user 135, and a third client device 140 operated by a third user 145. Each of the client devices (i.e., first client device 120, second client device 130, and third client device 140) may comprise, but is not limited to, a smart phone, a personal computer, a tablet device, a mobile device, a telephone, a remote control device, a set-top box, a digital video recorder, an Internet-of-Things (IoT) device, a network computer, a router, or other similar microcomputer-based device. AP 115 may be compatible with specification standards such as, but not limited to, the Institute of Electrical and Electronics Engineers (IEEE) 802.11ax specification standard for example.

Controller 105 may comprise a Wireless Local Area Network controller (WLC) and may provision and control coverage environment 105 (e.g., a WLAN). Controller 105 may allow first client device 120, second client device 130, and third client device 140 to join coverage environment 105. In some embodiments of the disclosure, controller 105 may be implemented by a Digital Network Architecture Center (DNAC) controller (i.e., a Software-Defined Network (SDN) controller) that may configure information for coverage environment 105 in order to provide correlation of devices and clients across addresses.

Operating environment 100 may also comprise a passive source 150 and a detector 155 by which embodiments of the disclosure may track elements (e.g., users and client devices) in coverage environment 110 via a passive technique. Passive, consistent with embodiments of the disclosure, may mean that the client device being tracked is passive (e.g., not transmitting). With the passive technique, client devices (e.g., first client device 120, second client device 130, and third client device 140) may not need to be connected to the WLAN in order to have their location detected and tracked. In other words, client devices may be detected and tracked by the passive technique without the client devices transmitting signals to AP 115 or receiving signals from AP 115.

Consistent with embodiments of the disclosure, controller 105 may control passive source 150 and detector 155. Passive source 150 may transmit signals into coverage environment 110. The signals transmitted by passive source 150 may reflect off elements (e.g., first client device 120, first user 125, second client device 130, second user 135, third client device 140, and third user 145) in coverage environment 110. The reflected signals may then be received by detector 155. Accordingly, controller 105 may use the signals sent by passive source 150 and the reflected signals received by detector 155 to locate and track the movement of first client device 120, first user 125, second client device 130, second user 135, third client device 140, and third user 145 in coverage environment 110 via a passive technique. Consequently, embodiments of the disclosure may locate users, devices, or IoT devices, for example, undergoing MAC randomization. As described in more detail below, passive source 150 may comprise, but is not limited to, Radio Frequency (RF) sensing, radar, and ultrasound RF sensing may comprise, but is not limited to, using the emissions from an RF source (or a standalone transmitter) as a passive way to track an object or element by tracking the reflected signals. The RF source may comprise, for example, the Wi-Fi AP (e.g., AP 115) itself, another AP using a different access technology and/or frequency (e.g., 60 GHz WiGig, 5G New Radio (NR), etc), or a separate RF source that may have the purpose of providing localization and/or motion detection via RF sensing. Passive RF sensing may not require the client device to be active because the passive technique may track the user or client device even if the device is not transmitting. Furthermore, a Doppler shifted RF reflections off a user or client device may provide information about whether the user or client device is stationary or moving and the directions of movement. Changes in the Channel State Information (CSI) as well as the direction of the reflections (e.g., via the use of multiple antennas on the sensing receiver) may provide information for tracking the user and their motion. Higher frequencies (e.g., 60 GHz), which may correspond to shorter RF wavelengths, may provide more granularity and allow geometrical objects (e.g., phones, tablet devices, or laptops) to be distinguished from larger, less directionally reflective objects (e.g., human body).

Radar may also be used in the passive technique. Radar chipsets with phased arrays and raster scanning functionality may be available (e.g., used for automotive applications, hand gesture tracking, etc.). They may operate in the mm-wave regime (e.g., 50 GHz-150 GHz), thus they may allow image resolution on the scale of, for example, tens of centimeters or less (depending on array size and propagation environment). Such devices may be cost effective and may image and track users and client devices as they move through coverage environment 110 for example.

Furthermore, ultrasound may be used in the passive technique. Ultrasound may provide a cost-effective process for locating and tracking elements in coverage environment 110. Due to the low speed of sound, ultrasound may be capable of spatial resolution on the order of centimeters or less.

The aforementioned passive techniques may provide a range of data relevant to overcoming the problems of MAC randomization. These techniques may provide an image of a user, an IoT device, and/or other device, from which the location may be tracked as a function of time. These techniques may not require the device to be actively transmitting or receiving in order to obtain an image or obtain additional information. Furthermore, the aforementioned passive techniques may provide data indicating whether the user, IoT device, and/or other device is stationary or in motion at a given time or during a time interval. From the data, information may be inferred regarding displacement, speed, and/or direction of the motion. The data provided by the passive technique may provide more collective information about the coverage area (i.e., coverage environment 110) or a specific subregion in the coverage area, indicating a level of motion present in the area. In other words, this data may relate to more than one user or client device. In particular, this information may be useful when there are multiple users or client devices in an area because this may be when the problem of resolving the ambiguity brought on by MAC randomization may be more challenging.

Embodiments of the disclosure may augment and correlate existing data with the data provided by passive techniques in order to provide additional processes for tracking a user or client device location within the wireless coverage area (e.g., room, building, outdoor venue, etc.). In particular, the data provided by passive techniques may provide an additional way to track a user or client device when the client device is not transmitting. The forementioned existing data may comprise, but is not limited to, client device MAC address and client device location obtained via active techniques (e.g., from 802.11, WiGig, LTE, 5G NR, etc.). The active techniques may comprise, but are not limited to, infrastructure based techniques and Fine Time Measurement (FTM) described in IEEE 802.11az. The infrastructure based techniques may use techniques comprising, but not limited to, Received Signal Strength Indicator (RSSI)-lateration and Angle of Arrival (AoA). Notwithstanding, the active techniques may comprise location tracking techniques based upon one or more schemes such as triangulation, time of flight, round trip delay measurements, IEEE 802.11mc, etc.

The elements described above of operating environment 100 (e.g., controller 105, AP 115, first client device 120, second client device 130, third client device 140, passive source 150, and detector 155) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 5, the elements of operating environment 100 may be practiced in a computing device 500.

Figure 2:
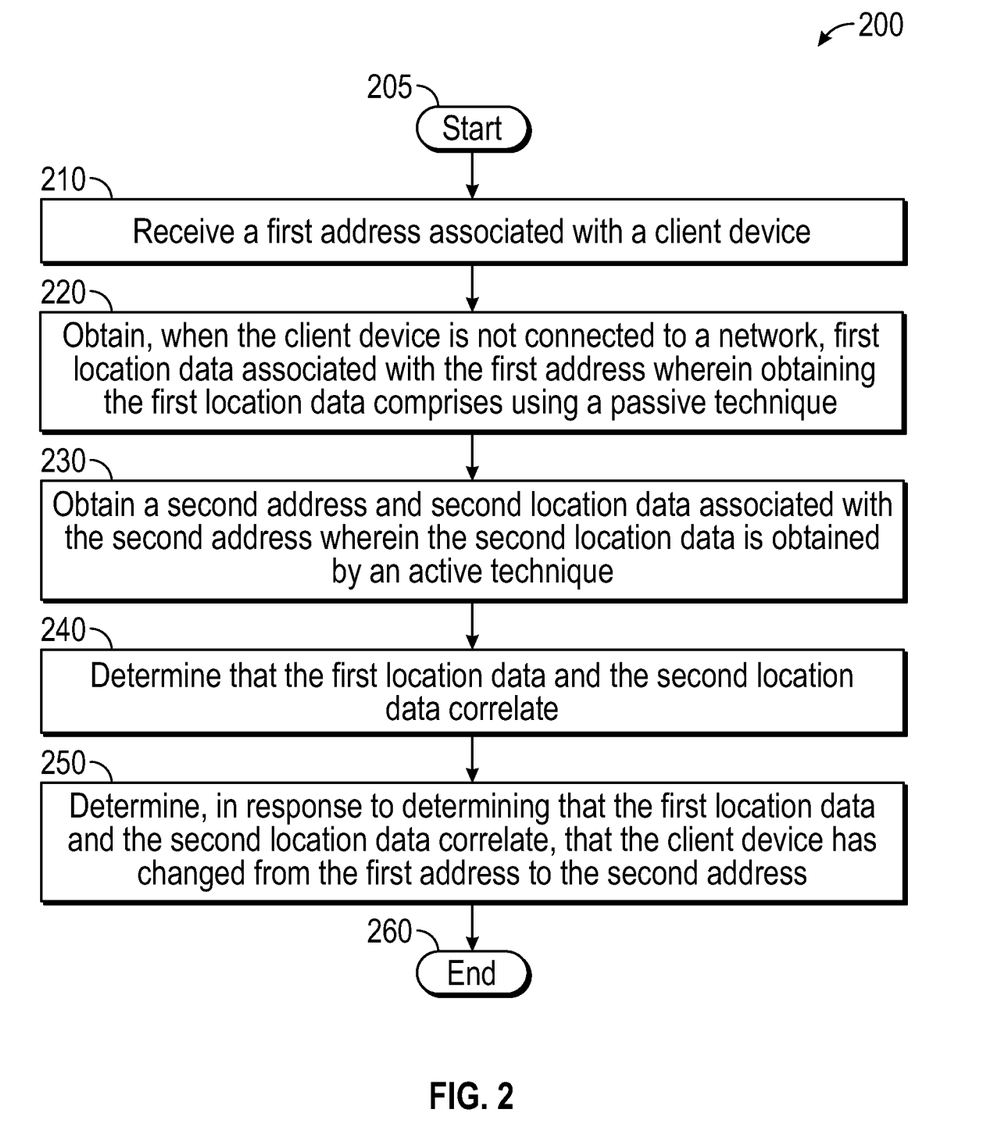
FIG. 2 is a flow chart of a method for correlating devices and clients across addresses.

FIG. 2 is a flow chart setting forth the general stages involved in a method 200 consistent with an embodiment of the disclosure for correlating devices and clients across addresses. Method 200 may be implemented using controller 105 as described in more detail above with respect to FIG. 1. Ways to implement the stages of method 200 will be described in greater detail below.

Method 200 may begin at starting block 205 and proceed to stage 210 where controller 105 may receive a first address associated with a client device. For example, at a time t1, first client device 120 operated by first user 125, second client device 130 operated by second user 135, and third client device 140 operated by third user 145 are located at respective first locations. At time t1, first client device 120, second client device 130, and third client device 140 are connected to the wireless network (i.e., connected to AP 115). At this time (or prior to this time), while at there present location, first client device 120, second client device 130, and third client device 140 may provide each of their respective MAC addresses to the network (e.g., transmit each of their respective MAC addresses to controller 105 through AP 115).

From stage 210, where controller 105 receives the first address associated with the client device, method 200 may advance to stage 220 where controller 105 may obtain, when the client device is not connected to a network, first location data associated with the first address wherein obtaining the first location data comprises using a passive technique. For example, during a subsequent time interval Δt (e.g., a second to minutes or longer) after t1, first client device 120, second client device 130, and third client device 140 may not be attached to the wireless network (e.g., neither transmit data to or receive data from the network). At some point during interval Δt, second client device 130 and third client device 140, for example, may randomize their respective MAC addresses, while first client device 120 may retain its MAC address and not randomize. First client device 120 (and first user 125) and second client device 130 (and second user 135) may stay in their original location, while third client device 140 and third user 145 may move to a new location during interval Δt. At a later time t2=t1+Δt, first client device 120, second client device 130, and third client device 140 are again attached to the wireless network. During the interval Δt, embodiments of the disclosure may use one or more of the aforementioned passive techniques to locate and track first client device 120 (and first user 125), second client device 130 (and second user 135), and third client device 140 (and third user 145).

Once controller 105 obtains, when the client device is not connected to the network, the first location data associated with the first address wherein obtaining the first location data comprises using the passive technique in stage 220, method 200 may continue to stage 230 where controller 105 may obtain a second address and second location data associated with the second address wherein the second location data is obtained by an active technique. For example, at the later time t2=t1+Δt, first client device 120, second client device 130, and third client device 140 may again be attached to the wireless network. At this time, second client device 130 and third client device 140, for example, may provide their new addresses (i.e., second address) that resulted from the randomization during interval Δt when they were not attached to the wireless network. First client device 120 may provide its old address because it did not randomize during interval Δt. Embodiments of the disclosure may use one or more of the aforementioned active techniques to obtain the location (i.e., second address data) for first client device 120, second client device 130, and third client device 140.

After controller 105 obtains the second address and the second location data associated with the second address wherein the second location data is obtained by the active technique in stage 230, method 200 may proceed to stage 240 where controller 105 may determine that the first location data and the second location data correlate. For example, at time t2, first client device 120 is still identified by its original MAC address, and first client device 120 (and first user 125) may be located by all possible techniques (i.e., active and/or passive). Not going through a MAC address randomization, there may be no ambiguity at the controller 105 level regarding first client device 120, its location, or its MAC address. Embodiments of the disclosure may provide additional passive techniques to locate first client device 120's (and first user 125's) position, which may provide additional benefits (e.g., more accurate location, higher confidence in the location, reduced uncertainty in the location, etc), for example, if the environment or conditions complicated the localization via passive techniques. The passive techniques may also help in tracking the trajectory of first client device 120 (and first user 125) between time t1 and time t2.

At time t2, second client device 130 now has a new MAC address relative to before. From a network management perspective, there may be ambiguity whether this is an entirely new client device in the coverage area making its first attachment, or whether it is a previously connected device with a randomized MAC address. In the latter option, the network management layer may benefit by knowing second client device 130's prior MAC address, for example, by knowing that the two MAC addresses are for the same client device (i.e., second client device 130). The aforementioned passive techniques may allow for correlation of the two MAC addresses. For example, passive techniques may provide data that second client device 130 had been stationary between time t1 and time t2, thus providing strong evidence that the two MAC addresses are for the same client device (i.e., second client device 130).

At time t2, third client device 140 (and third user 145) has moved its position and has a new MAC address relative to before. From a network management perspective, there may be ambiguity whether this is an entirely new client device in the coverage area making its first attachment, or whether it is a previously connected device with a randomized MAC address. Embodiments of the disclosure may provide a process for correlation of the client device (and new MAC address) with the prior client device with old MAC address. Specifically, the passive techniques may provide data that the user or client device has moved from the last known position at time t1, to the new position at time t2, thus providing strong evidence that the client device with the new mac address is the same as the client device with the old address.

Figure 3:
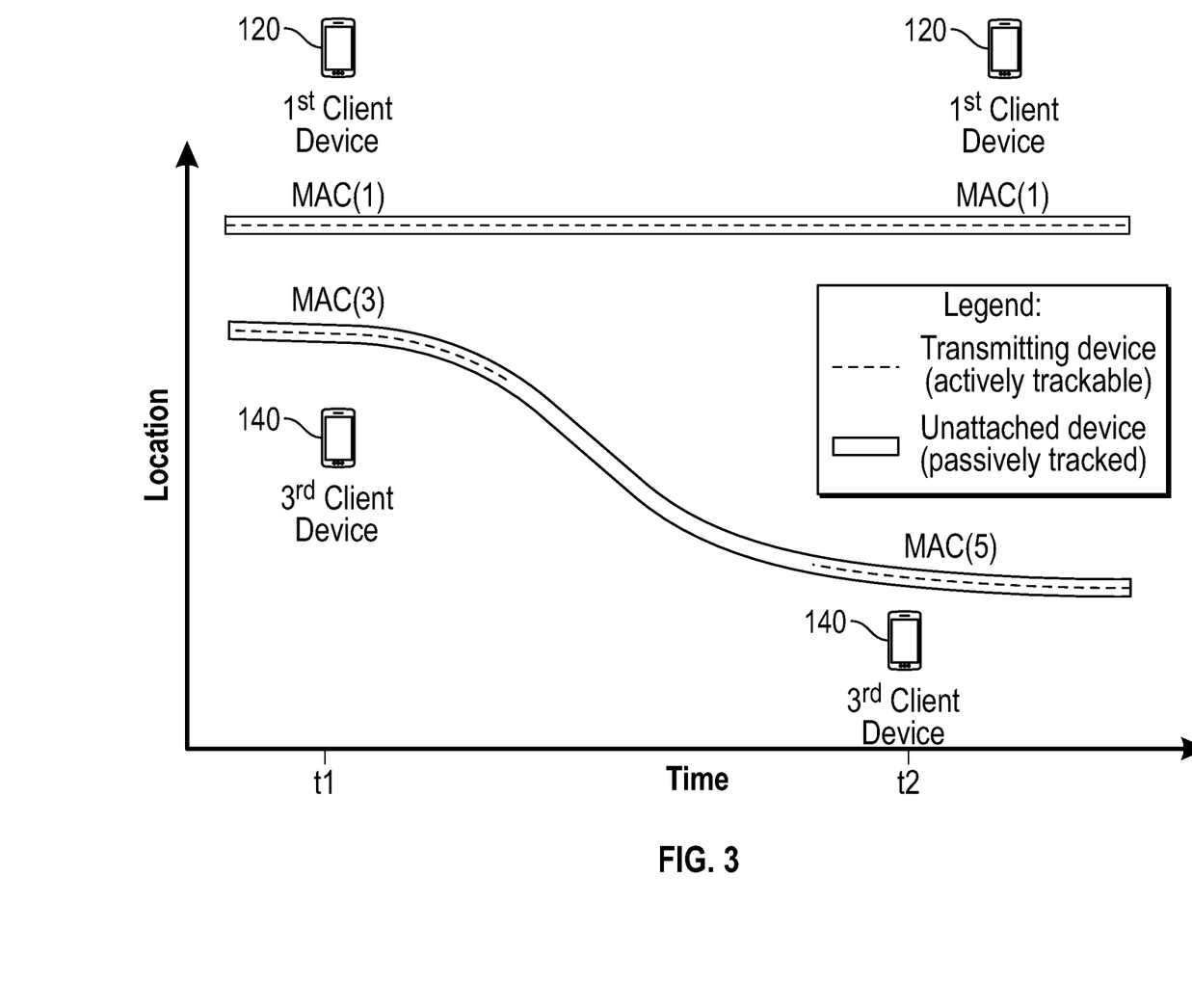
FIG. 3 is a diagram that illustrates resolution of device ambiguity due to address randomization.

From stage 240, where controller 105 determines that the first location data and the second location data correlate, method 200 may advance to stage 250 where controller 105 may determine, in response to determining that the first location data and the second location data correlate, that the client device has changed from the first address to the second address. For example, FIG. 3 is a diagram that illustrates resolution of device ambiguity due to address randomization. As shown in FIG. 3, first client device 120 may have MAC address MAC(1) and a first location at time t1. At time t2, first client device 120 may still have MAC address MAC(1) and be at first location. In this example, first client device 120 did not change location or randomize its MAC address. Because first client device 120 did not randomize its MAC address, no ambiguity was created. As is also shown in FIG. 3, third client device 140 may have MAC address MAC(3) and a first location at time t1. By time t2, third client device 140 may have not transmitted (e.g., not connected to the wireless network) for some period between t1 and t2, may have randomized its MAC address to MAC(5), and moved to a second location. Because third client device 140, while it was not connected to the wireless network, randomized its MAC address and moved, ambiguity was created. In other words, when it reconnected to the wireless network, it may look like a new client device to controller 105.

Consistent with embodiments of the disclosure, the aforementioned passive techniques may help resolve client device ambiguity brought on by MAC randomization. With respect to the example shown in FIG. 3, controller 105 may correlate data from the passive technique and data from the active technique to determine that the client device that connected to the wireless network with MAC address MAC(5) is third client device 140 that previously connected to the wireless network with MAC address MAC(3). For example, while third client device 140 was disconnected from the wireless network, the passive techniques may have tracked third client device 140 from its location at t1 to its location at t2. Then, when third client device 140 reconnects to the wireless network at t2 with its new randomized MAC address of MAC(5), rather than seeing this as a new device, controller 105 may see this as third client device 140. This is because a location determined by an active technique when third client device 140 reconnected to the wireless network produced a location that correlated with the location for third client device 140 produced by the passive technique while third client device 140 was disconnected from the wireless network and reconnected. Once controller 105 determines, in response to determining that the first location data and the second location data correlate, that the client device has changed from the first address to the second address in stage 250, method 200 may then end at stage 260.

Figure 4:
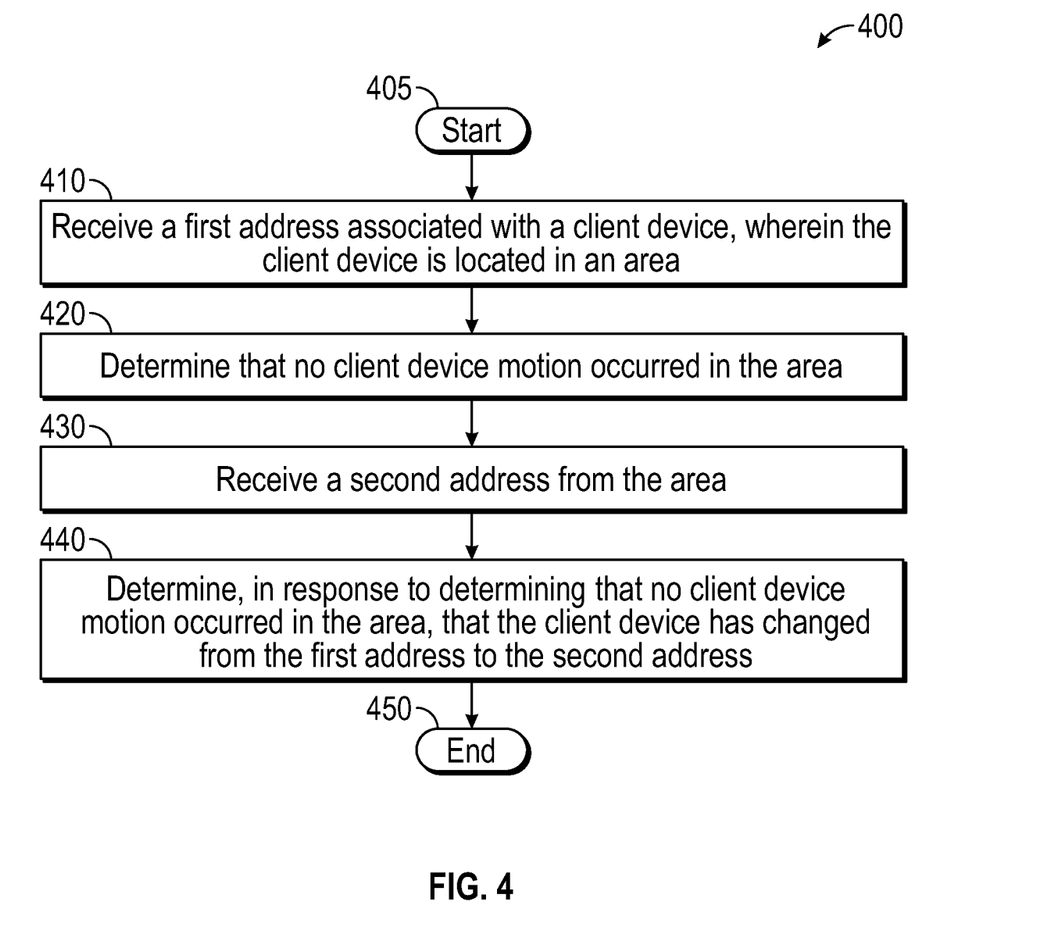
FIG. 4 is a flow chart of a method for correlating devices and clients across addresses.

FIG. 4 is a flow chart setting forth the general stages involved in a method 400 consistent with an embodiment of the disclosure for correlating devices and clients across addresses. Method 400 may be implemented using controller 105 as described in more detail above with respect to FIG. 1. Ways to implement the stages of method 400 will be described in greater detail below.

Method 400 may begin at starting block 405 and proceed to stage 410 where controller 105 may receive a first address associated with a client device, wherein the client device is located in an area. For example, first client device 120 or second client device 130 may be located within an area of coverage environment 110 and either may provide their address (e.g., MAC address) to controller 105.

From stage 410, where controller 105 receive the first address associated with the client device, wherein the client device is located in the area, method 400 may advance to stage 420 where controller 105 may determine that no device motion occurred in the area. For example, within the area in coverage environment 110 containing first client device 120 or second client device 130, using the aforementioned CSI, controller 105 may determine that first client device 120 or second client device 130 did not move during the time between t1 and t2. In some instances, data from the aforementioned passive techniques may not provide a usable image of the coverage area, user, or client device. However, the CSI may provide data for resolving many situations. For example, the CSI may infer the presence or absence of motion in coverage environment 110, or a part of coverage environment 110 (e.g., the use of directional multi-element sources and/or receivers). CSI may also support inferences about the user or client device's displacement or speed, and/or bounds upon their range.

Consistent with embodiments of the disclosure, a video camera may comprise another example of a passive sensor that may detect the presence or absence of motion in an environment. For example, a video camera with a fisheye lens may be placed on the ceiling of a room that may have visibility over the entire room and hence determine motion or no-motion in the room.

Once controller 105 determines that no device motion occurred in the area in stage 420, method 400 may continue to stage 430 where controller 105 may receive a second address from the area. For example, after t2, controller 105 may receive a second address from a client device in the area in which second client device 120 was located before t1.

After controller 105 receive a second address from the area in stage 430, method 400 may proceed to stage 440 where controller 105 may determine, in response to determining that no client device motion occurred in the area, that the device has changed from the first address to the second address. For example, because no device motion occurred in the area between t1 and t2 in which second client device 120 was located before t1, controller 105 may determine that second client device 120 has randomized (i.e., changed) from the first address to the second address. Once controller 105 determines, in response to determining that no client device motion occurred in the area, that the client device has changed from the first address to the second address in stage 440, method 400 may then end at stage 450.

Figure 5:
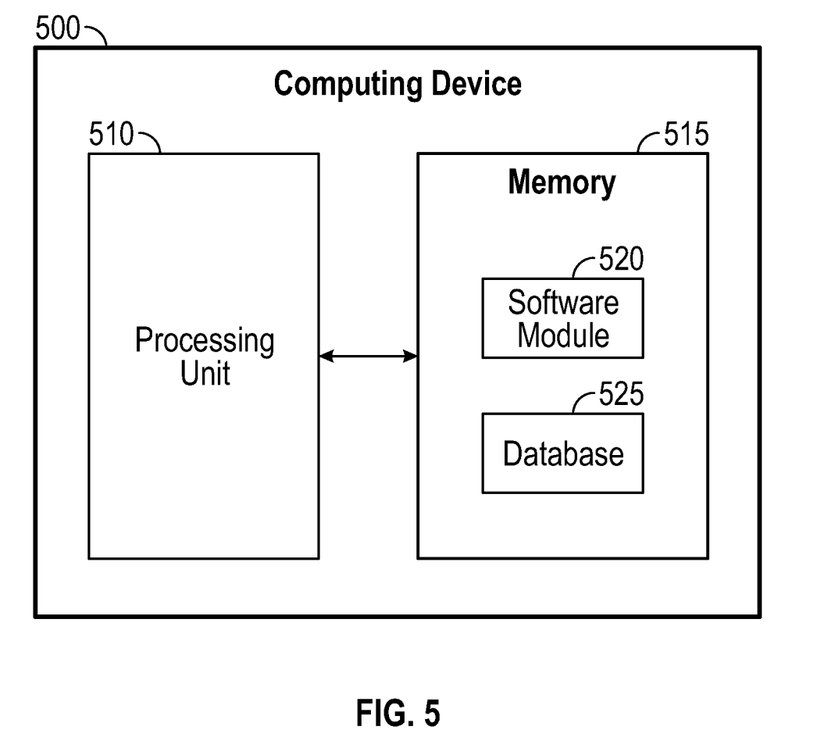
FIG. 5 is a block diagram of a computing device.

FIG. 5 shows computing device 500. As shown in FIG. 5, computing device 500 may include a processing unit 510 and a memory unit 515. Memory unit 515 may include a software module 520 and a database 525. While executing on processing unit 510, software module 520 may perform, for example, processes for correlating devices and clients across addresses as described above with respect to FIG. 2 and FIG. 4. Computing device 500, for example, may provide an operating environment for controller 105, AP 115, first client device 120, second client device 130, third client device 140, passive source 150, and detector 155. Controller 105, AP 115, first client device 120, second client device 130, third client device 140, passive source 150, and detector 155 may operate in other environments and are not limited to computing device 500.

Computing device 500 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 500 may comprise any computer operating environment, such as hand-held devices, multiprocessor systems, microprocessor-based or programmable sender electronic devices, minicomputers, mainframe computers, and the like. Computing device 500 may also be practiced in distributed computing environments where tasks are performed by remote processing devices. The aforementioned systems and devices are examples and computing device 500 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 500 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
    receiving a first address associated with a client device at a first time when the client device is connected to a network, wherein the client device is located in an area;
    obtaining, when the client device is not connected to the network, first location data associated with the client device;
    determining, based on the first location data associated with the client device, that no client device motion occurred in the area by obtaining a trajectory of the client device using a passive technique for a predetermined time from the first time when the client device is not connected to the network;
    receiving a second address from the area at a second time after the predetermined time from the first time when the client device is connected again to the network; and
    determining, in response to determining that no client device motion occurred in the area between the first time and the second time, that the client device has changed from the first address to the second address.

2. The method of claim 1, further comprising obtaining the trajectory of the client device using the passive technique.

3. The method of claim 2, wherein obtaining the first location data comprises obtaining the first location data using the active technique comprising an infrastructure based technique.

4. The method of claim 3, wherein using the active technique comprises using Fine Time Measurement (FTM).

5. The method of claim 1, wherein using the passive technique comprises using Radio Frequency (RF) sensing.

6. The method of claim 1, wherein using the passive technique comprises using a radar.

7. The method of claim 1, wherein using the passive technique comprises using ultrasound Itrasound.

8. A system comprising:
    a memory storage; and
    a processing unit coupled to the memory storage, wherein the processing unit is operative to:
        receive a first address associated with a client device at a first time when the client device is connected to a network, wherein the client device is located in an area;
        obtain, when the client device is not connected to the network, first location data associated with the client device;
        determine, based on the first location data associated with the client device, that no client device motion occurred in the area by obtaining a trajectory of the client device using a passive technique for a predetermined time from the first time when the client device is not connected to the network;
        receive a second address from the area at a second time after the predetermined time from the first time when the client device is connected again to the network; and
        determine, in response to determining that no client device motion occurred in the area between the first time and the second time, that the client device has changed from the first address to the second address.

9. The system of claim 8, wherein the processing unit being further operative to obtain the trajectory of the client device using the passive technique.

10. The system of claim 9, wherein obtaining the first location data comprises obtaining the first location data using the active technique comprising an infrastructure based technique.

11. The system of claim 8, wherein the passive technique comprises a Radio Frequency (RF) sensing device.

12. The system of claim 8, wherein the passive technique comprises a radar.

13. The system of claim 8, wherein the passive technique comprises an ultrasound device.

14. A non-transitory computer-readable medium that stores a set of instructions which when executed perform a method executed by the set of instructions comprising:
    receiving a first address associated with a client device at a first time when the client device is connected to a network, wherein the client device is located in an area;
    obtaining, when the client device is not connected to the network, first location data associated with the client device;
    determining, based on the first location data associated with the client device, that no client device motion occurred in the area by obtaining a trajectory of the client device using a passive technique for a predetermined time from the first time when the client device is not connected to the network;
    receiving a second address from the area at a second time after the predetermined time from the first time when the client device is connected again to the network; and
    determining, in response to determining that no client device motion occurred in the area between the first time and the second time, that the client device has changed from the first address to the second address.

15. The non-transitory computer-readable medium of claim 14, further comprising obtaining the trajectory of the client device using the passive technique.

16. The non-transitory computer-readable medium of claim 15, wherein obtaining the first location data comprises obtaining the first location data using the active technique comprising an infrastructure based technique.

17. The non-transitory computer-readable medium of claim 16, wherein using the active technique comprises using Fine Time Measurement (FTM).

18. The non-transitory computer-readable medium of claim 14, wherein using the passive technique comprises using Radio Frequency (RF) sensing.

19. The non-transitory computer-readable medium of claim 14, wherein using the passive technique comprises using a radar.

20. The non-transitory computer-readable medium of claim 14, wherein using the passive technique comprises using a ultrasound device.

\* \* \* \* \*